UNITED STATES PATENT OFFICE.

JOHN F. WANDERSEE, OF HIGHLAND PARK, ROBERT PERETTO, OF DETROIT, AND THEODORE A. L. ALBRECHT, OF ROYAL OAK, MICHIGAN, ASSIGNORS TO FORD MOTOR COMPANY, OF DETROIT, MICHIGAN, A CORPORATION OF MICHIGAN.

METAL ALLOY.

1,376,056.   Specification of Letters Patent.   Patented Apr. 26, 1921.

No Drawing.   Application filed September 10, 1919. Serial No. 322,865.

*To all whom it may concern:*

Be it known that we, JOHN F. WANDERSEE, ROBERT PERETTO, and THEODORE A. L. ALBRECHT, citizens of the United States of America, residing at Highland Park, Wayne county; Detroit, Wayne county, and Royal Oak, Oakland county, respectively, all in the State of Michigan, have invented certain new and useful Improvements in Metal Alloys, of which the following is a specification.

Our invention relates to a metal alloy which is particularly applicable for use in the production or manufacture of cutting or forming implements or tools requiring any or all of the qualities of toughness, hardness and ductility, and being especially capable of withstanding the requirements necessary in cutting tools or instruments used on lathes, or milling cutters, which are operated at great speed, or in forming implements which are under great pressure.

One object of our invention is to produce an alloy which is of such hardness as to be capable of cutting or forming hard substances, and especially of cutting such hard substances while being operated at great speed, but which at the same time has the qualities of toughness, and ductility which will resist breakage and will not easily wear when in use for such purpose of cutting hard substances, and especially when being operated at a high speed, and will also resist breakage when under great pressure.

Our alloy makes an excellent lathe tool. For cutting 1.10 carbon steel on a hand fed lathe, we believe 788 revolutions per minute, or a little more, to be the most efficient speed, although it is possible to reach a maximum speed of more than twice that number. A cutting tool of our alloy will withstand this use longer than any other alloy we have seen used, and we believe, longer than any cutting tool used commercially.

Also a cutting tool made from our alloy will take a high luster and does not corrode when exposed to the air or elements; the fumes of a chemical laboratory do not affect it.

We are aware that other alloys and high speed tools of various compositions have been used for these purposes, but the weakness of these metals lies in the fact that they are either so hard as to be brittle, and easily broken when placed in use as a high speed cutting tool; too soft to withstand great pressure and wear required of them in such use; or are not ductile.

A metal such as ours is hard enough to cut glass or steel; tough enough to withstand a blow from a hammer, and ductile enough to bend slightly from the same blow of the hammer.

For melting, graphite crucibles may be used for the reason that it will absorb a small percentage of carbon therefrom. It is, of course, not essential that graphite crucibles be used.

As the main constituents of our alloy we prefer carbon, chromium, tungsten and cobalt. The presence of iron in an amount up to fifteen per cent., together with these constituents, will also make an excellent alloy for the production of such tools as herein specified.

It is not a requirement of our alloy that all of these metals be entirely, or even substantially pure. It is possible to use ferrocromium which will contain about seventy to eighty per cent. chromium and the other twenty or thirty per cent. being almost entirely iron, the exception being a small percentage of carbon. For this reason our alloy will contain more or less iron. We have obtained good results from the use of powdered tungsten, approximately 98% pure, and cobalt 97% pure.

It is understood that in the use of such metals not entirely pure, small percentages of other metals will appear in the alloy. This will be noted in the analysis hereinafter quoted in which these small quantities of other metals will appear, while only the metals carbon, chromium, cobalt, and tungsten were used, the small percentage of other metals being in and coming from such original constituents of the alloy.

We wish it to be understood, however, that pure, or substantially pure carbon, chromium, cobalt and tungsten, with the addition of iron, from two to fifteen per cent. iron, if desired, may be used with practically as good effect as those containing a small amount of other metals or impurities.

A chemical analysis of two of our experiments which produced an alloy of the properties contained in our invention showed the following constituents in their relative proportions:

No. 1.

| | |
|---|---|
| Carbon | 2.54% |
| Chromium | 29.31 |
| Tungsten | 10.98 |
| Iron | 3.38 |
| Silicon | 1.34 |
| Cobalt | 50.67 |
| Nickel | .16 |

No. 2.

| | |
|---|---|
| Carbon | 2.04% |
| Chromium | 26.06 |
| Tungsten | 11.86 |
| Iron | 11.64 |
| Silicon | .22 |
| Cobalt | 47.31 |
| Aluminum | Trace. |

Both of these alloys are within our invention and make excellent alloys for cutting, milling and forming implements and tools such as hereinbefore described.

It is to be understood that these proportions may be varied to meet special requirements.

We wish it to be understood that other metals of the chromium group may be used in the place of tungsten in the compounding of our alloy. By other members of the chromium group, we mean either molybdenum or uranium.

What we claim is:

1. Metal alloy, composed of carbon two to five per cent., cobalt thirty-five to sixty-five per cent., chromium and tungsten.

2. Metal alloy composed of chromium from twenty to thirty-five per cent., tungsten from five to twenty per cent., cobalt from forty to sixty per cent. and carbon from two to five per cent.

3. Metal alloy composed of chromium from twenty to thirty-five per cent., tungsten from five to twenty per cent., cobalt from forty to sixty per cent. and carbon in the proportion of more than one per cent. of the whole.

4. Metal alloy composed of chromium from twenty to thirty-five per cent., tungsten from five to twenty per cent., cobalt from forty to sixty per cent. and carbon from two to five per cent., the ingredients all being more than ninety-five per cent. pure with the exception of chromium, the latter being more than sixty per cent. pure.

5. Metal alloy composed of chromium from twenty-five to thirty-five per cent., a metal of the chromium group equivalent to, or substantially equivalent to, tungsten from five to twenty per cent., cobalt from forty to sixty per cent. and carbon from two to five per cent., the ingredients all being more than than ninety-five per cent. pure, except chromium, the latter being more than sixty per cent. pure.

6. Metal alloy composed of chromium about twenty-nine per cent., a member of the chromium group equivalent to, or substantially equivalent to, tungsten about eleven per cent., cobalt fifty per cent. and carbon from two to three per cent.

7. Metal alloy composed of chromium fifteen to forty per cent., cobalt thirty-five to sixty-five per cent., tungsten and carbon.

In testimony whereof we affix our signatures in the presence of two witnesses.

JOHN F. WANDERSEE.
ROBERT PERETTO.
THEODORE A. L. ALBRECHT.

Witnesses:
WM. H. SMITH,
J. K. HARNESS.